(12) United States Patent
Nomura (10) Patent No.: US 11,524,378 B2
(45) Date of Patent: Dec. 13, 2022

(54) DUST COLLECTION DEBURRING APPARATUS

(71) Applicant: FANUC CORPORATION, Yamanashi (JP)

(72) Inventor: Kenta Nomura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 483 days.

(21) Appl. No.: 16/706,886

(22) Filed: Dec. 9, 2019

(65) Prior Publication Data

US 2020/0180093 A1 Jun. 11, 2020

(30) Foreign Application Priority Data

Dec. 11, 2018 (JP) .............................. JP2018-231545

(51) Int. Cl.
*B23Q 11/00* (2006.01)
(52) U.S. Cl.
CPC .............................. *B23Q 11/0046* (2013.01)
(58) Field of Classification Search
CPC ........ B23Q 7/00; B23Q 7/1426; B23Q 11/08; B23Q 11/0046; B24B 55/06
See application file for complete search history.

(56) References Cited

U.S. PATENT DOCUMENTS 8,789,312 B2 * 7/2014 Landerer ............ B23Q 11/0833
49/116

FOREIGN PATENT DOCUMENTS

| JP | H06-134680 A | | 5/1994 |
|----|----|----|----|
| JP | H07-37584 U | | 7/1995 |
| JP | 3023203 U | | 4/1996 |
| JP | H08-224552 A | | 9/1996 |
| JP | H0985574 A | * | 3/1997 |
| JP | 2006-341359 A | | 12/2006 |
| JP | 2007-190623 A | | 8/2007 |
| JP | 2007190623 A | * | 8/2007 |

OTHER PUBLICATIONS

An Office Action; "Notice of Reasons for Refusal", mailed by the Japanese Patent Office dated Jun. 1, 2021, which corresponds to Japanese Patent Application No. 2018-231545 and is related to U.S. Appl. No. 16/706,886; with English language translation.

* cited by examiner

*Primary Examiner* — Joseph J Hail
*Assistant Examiner* — J Stephen Taylor
(74) *Attorney, Agent, or Firm* — Studebaker & Brackett PC (57) ABSTRACT

To provide a dust collection deburring apparatus which is capable of performing efficient and preferable debarring work and which is capable of, even in the case of handing a large workpiece, performing preferable deburring work by placing the workpiece together with a pallet on a work table by a forklift. A dust collection deburring apparatus A includes a work table apparatus configured to allow a product together with a pallet to be placed on and allow a worker to perform deburring work, a chip antiscattering apparatus arranged so as to surround the work table apparatus and configured to prevent scattering of chips, and a chip suction collection apparatus including a dust collecting device configured to suck air from an internal space surrounded by the chip antiscattering apparatus to suck the chips generated in the deburring work.

8 Claims, 8 Drawing Sheets

DUST COLLECTION DEBURRING APPARATUS

This application is based on and claims the benefit of priority from Japanese Patent Application No. 2018-231545, filed on 11 Dec. 2018, the content of which is incorporated herein by reference.

BACKGROUND OF THE INVENTION

Field of the Invention

The present invention relates to a dust collection debuting apparatus for debuting work to a workpiece after machining by a machine tool.

Related Art

In a conventional manner, a workpiece (work, product) after machining by a machine tool is generally subjected to the removal of the flashes generated at the edge parts and the like of the machined surface, and the cleaning and removal of the chips attached to the workpiece (refer to, for example, Patent Document 1). In the debuting work, a worker wearing a protective device uses a tool such as a grinder to cut and polish the portions with flashes of the workpiece.

Patent Document 1: Japanese Unexamined Patent Application, Publication No. 2006-341359

SUMMARY OF THE INVENTION

In the deburring work and the chip cleaning work, the chips are scattered and may enter the eyes of the worker, resulting in that an occupational accident may occur. Moreover, the chips are scattered and fall on the floor surface and the wall, resulting in that the environment may be deteriorated.

For this reason, in general, the deburring work and the chip cleaning work are performed while the scattered chips are collected. A work table put to practical use on which a workpiece is placed itself is provided with the function of collecting the scattered chips in the deburring work or the chip cleaning work, so as to effectively prevent the scattering of the chips, and collect and remove the chips.

However, such a work table provided with the function of collecting chips is able to handle only workpieces less than upper limits in weight and size, and is not able to handle large workpieces. In general and in many cases, a workpiece is placed on a pallet and delivered by a forklift. However, a forklift is not able to place a workpiece together with a pallet on a work table, and thus the troublesome work of separately delivering a workplace on a work table needs to be performed, and further a lifting machine for the work and a worker are required.

In view of the above circumstances, the present invention is to provide a dust collection deburring apparatus which is capable of performing efficient and preferable deburring work and which is further capable of, even in the case of handing a large workpiece, performing preferable deburring work by placing the workpiece together with a pallet on a work table by a forklift.

The present inventors have accomplished the present invention, by achieving the means which allows efficient and preferable deburring work, and which performs, even in the case of handling a large workpiece, preferable deburring work by placing the workpiece together with a pallet on a work table by a forklift.

(1) The present invention is characterized in that an apparatus for deburring work to a product (for example, a workpiece W to be described below) placed on a pallet (for example, a pallet 4 to be described below). The apparatus includes a work table apparatus (for example, a work table apparatus 1 to be described below) configured to allow the product together with the pallet to be placed on and allow a worker (for example, a worker M to be described below) to perform the deburring work, a chip antiscattering apparatus (for example, a chip antiscattering apparatus 2 to be described below) arranged so as to surround the work table apparatus and configured to prevent scattering of chips, and a chip suction collection apparatus (for example, a chip suction collection apparatus 3 to be described below) including a dust collecting device (for example, a dust collecting device 15 to be described below) configured to suck air from an internal space surrounded by the chip antiscattering apparatus to suck the chips generated in the deburring work.

(2) in the present invention according to (1), the work table apparatus may include a table (for example, a table 5 to be described below), and a chip pan (for example, a chip pan 6 to be described below) supported by the table and placed on the table, and a rotating mechanism (for example, a rotating mechanism 7 to be described below) supported by the table and configured to support the pallet and the product placed on the chip pan in a rotatable manner around a rotary axis extending in the vertical direction.

(3) in the present invention according to (1) or (2), the chip suction collection apparatus may be configured so that the dust collecting device sucks and collects the chips received by the chip pan.

(4) In the present invention according to (2) or (3), the work table apparatus may include a lifting mechanism (for example, a lifting mechanism 8 to be described below) configured to move the table upward and downward in the vertical direction.

(5) The present invention according to any one of (1) to (4) may include a blower device (for example, a blower device 13 to be described below) configured to send air from behind the worker entering an inside of the chip antiscattering apparatus to perform the deburring work, toward the product placed on the work table apparatus.

(6) in the present invention according to (5), the blower device may be configured so that air blows from behind obliquely to the worker entering the inside through a worker entrance opening (for example, a worker entrance opening S1 to be described below) disposed to the chip antiscattering apparatus to perform the deburring work, and further forms an air curtain configured to obstruct the worker entrance opening.

(7) In the present invention according to any one of (1) to (6), the chip antiscattering apparatus may include a partition wall part (for example, a partition wall part 10 to be described below) vertically provided so as to surround the work table apparatus, and the partition wall part may be configured so that at least a part of the partition wall part is allowed to perform rotation around a central axis extending in the vertical direction, and that the rotation forms at least one of the worker entrance opening and a product delivery opening (for example, a product delivery opening S2 to be described below). The worker entrance opening is configured to allow the worker to enter an inside of the partition wall part and exit to an outside of the partition wall part. The product delivery opening is configured to allow the product together with the pallet to be delivered to and from the work table apparatus inside the partition wall part.

(8) in the present invention according to (7), the partition wall part may be configured, so that a part of the partition wall part is allowed to perform the rotation to be slid in a direction alone a wall surface of the partition wall part and that a sliding operation for open forms the product delivery opening.

(9) in the present invention according to (8), the chip antiscattering apparatus may be configured, so that an intrusion prevention member (for example, an intrusion prevention member 11 to be described below) protrudes to the worker entrance opening when the sliding operation for open of the partition wall part is performed, and prevents the worker from entering the inside through the worker entrance opening.

(10) In the present invention according to any one of (2) to (9), the chip pan may include a wall part (for example, a wall part 6a to be described below) projecting upward and extending along a peripheral edge of the chip pan, and the peripheral edge with at least the wall part may be formed so as to be in contact with and along an inner surface of the partition wall part of the chip antiscattering apparatus.

The present invention enables to perform efficient and preferable deburring work, and further enables to, even in the case of handling a large workpiece, perform preferable deburring work by placing the workpiece together with a pallet on a work table by a forklift.

DETAILED DESCRIPTION OF THE INVENTION

A dust collection deburring apparatus according to one embodiment of the present invention will be described below by referring to FIG. 1 to FIG. 8.

The present embodiment relates to a dust collection deburring apparatus which is capable of performing deburring work to a workpiece (product) after machining by a machine tool while preventing the scattering of chips, and particularly even in the case of handling a large workpiece, capable of performing preferable deburring work by placing the workpiece together with a pallet on a work table by a forklift.

Specifically, as shown in FIG. 1 to FIG. 5, a dust collection deburring apparatus A according to the present embodiment is configured with a work table apparatus 1, a chip antiscattering apparatus 2 and a chip suction collection apparatus 3.

The work table apparatus 1 is the apparatus allowing a workpiece W, which is a product, together with a pallet 4 to be placed on and allowing a worker N to perform deburring work. The work table apparatus 1 is configured with a table 5, a chip pan 6 which has a substantially flat plate shape and which is supported by the table 5 and provided on the table 5, a rotating mechanism 7 which is supported by the table 5 and which supports the pallet 4 and the workpiece W placed on the chip pan 6 in a rotatable manner around a rotary axis O1 extending in the vertical direction, and a lifting mechanism 8 which moves the table 5 upward and downward in the vertical direction.

Each of the rotating mechanism 7 and the lifting mechanism 8 is configured with a drive source, for example, an electric motor driven upon the button operation performed by the worker M, so as to rotate the table 5 in normal and reverse directions around the rotary axis O1 extending in the vertical direction or to move the table 5 upward and downward in the vertical direction, upon the normal or reverse rotational driving of the driving source. It is noted that each configuration of the rotating mechanism 7 and the lifting mechanism 8 needs not to be limited to a particular configuration, as long as the configuration enables to rotate or move upward and downward the table 5 or the pallet 4.

The chip antiscattering apparatus 2 is vertically provided so as to surround the work table apparatus 1, and includes a partition wall part 10 configured to prevent the scattering to the outside, of the chips generated in the deburring work.

As shown in FIG. 1 to FIG. 5, FIG. 6, FIG. 7 and FIG. 8, the partition wall part 10 is configured, so that at least a part thereof is rotatable around a central axis O2 extending in the vertical direction, and such rotation forms a worker entrance opening (an opening part for worker entrance/exist) S1 through which the worker M enters the inside of the partition wall part 10 and exits to the outside, and a product delivery opening (an opening part for product delivery) S2 through which the workpiece W together with the pallet 4 is delivered to and from the work table apparatus 1 inside the partition wall part 10.

More specifically, the partition wall part 10 according to the present embodiment is formed substantially in a letter-C shape in a plan view in an initial state (refer to FIG. 4), including the worker entrance opening S1. The partition wall part 10 is configured so that a part thereof is slidable and rotatable in a direction along the wall surface of the partition wall part 10. A sliding operation for open (refer to FIG. 5) forms the product delivery opening S2.

The partition wall part 10 is configured with an intrusion prevention member 11 which is configured to perform the sliding operation for open and protrude to the worker entrance opening S1. The intrusion prevention member 11 prevents the worker M from entering the inside through the worker entrance opening S1, when the product delivery opening S2 is formed.

The partition wall part 10 according to the present embodiment is configured with a transparent wall member, for example, above the heights of the table 5 and the chip pan 6 of the work table apparatus 1 disposed inside the partition wall part 10, and above the position of the waist of the worker M. Thus, through the partition wall part 10, the worker M is able to check the outside from the inside of the partition wall part 10, and a person positioned outside is able to check the inside of the partition wall part 10.

The partition wall part 10 includes a lighting device 12 configured to illuminate the inside.

The partition wall part 10 further includes a blower device 13 configured to send air from behind the worker M who enters the inside of the partition wall part 10 to perform the deburring work, toward the workpiece W placed on the work table apparatus 1. The blower device 13 serves as one component of the chip antiscattering apparatus 2.

In the present embodiment, an air nozzle 13a of the blower device 13 is disposed at each of one edge part and the other edge part forming the worker entrance opening S1 of the partition wall part 10. Air blows from the air nozzle 13a disposed at each of the one edge part and the other edge part forming the worker entrance opening S1 of the partition wall part 10 as described above, and thus air blows from behind obliquely to the worker M who enters the inside through the worker entrance opening S1 to perform the deburring work, and forms the air curtain obstructing the worker entrance opening S1.

The chip pan 6 of the work table apparatus 1 is formed with a wall part 6a which projects upward and extends along the peripheral edge thereof, and the peripheral edge with at least the wall part 6a is formed along the inner surface of the partition wall part 10 of the chip antiscattering apparatus 2. It is noted that the wall part 6a of the chip pan 6 is configured to suppress the chips received by the chip pan 6 from failing, and is preferably disposed in contact with the inner surface of the partition wall part 10.

The chip suction collection apparatus 3 includes a dust collecting device 15 configured to suck air from the internal space surrounded by the chip antiscattering apparatus 2 (the partition wall part 10) to suck the chips generated in the deburring work.

In the present embodiment, a chip suction hole 14 is formed as a through hole at a predetermined position of the chip pan 6 from the upper surface to the lower surface. The tip of a suction pipe 16 extending from the dust collecting device 15 is connected to the chip suction hole 14, so that the chips on the chip pan 6 are sucked and collected by the dust collecting device 15. It is noted that, in an example, a plurality of the chip suction holes 14 may be dispersedly disposed at predetermined positions of the chip pan 6, and the suction pipes 16 extending from the dust collecting device 15 may be connected to the plurality of chip suction holes 14, respectively. In another configuration, the dust collecting device 15 and the suction nozzle of the suction pipe 16 may be disposed at desired positions inside the partition wall part 10 so as to suck and collect the scattered chips, not only to suck the chips on the chip pan 6, resulting in effectively preventing the scattering of the chips to the outside.

The dust collection deburring apparatus A according to the present embodiment configured as described above includes the work table apparatus 1 on which the workpiece W together with the pallet 4 is placed and the worker M performs the deburring work, the chip antiscattering apparatus 2 configured to prevent the scattering of the chips, and the chip suction collection apparatus 3 including the dust collecting device 15 configured to suck air from the internal space surrounded by the chip antiscattering apparatus 2 to suck the chips generated in the deburring work, thereby enabling to perform the deburring work to the workplace W while preventing the scattering of the chips and collecting the chips.

The work table apparatus 1 includes the table 5, the chip pan 6 and the rotating mechanism 7 configured to rotate the pallet 4 and the workpiece W, thereby enabling to perform the deburring work while receiving the chips on the chip pan 6 and preventing the scattering of the chips. The rotating mechanism enables to rotate the pallet 4 and the workpiece w inside the chip antiscattering apparatus 2, and thus the worker N who enters the inside of the chip antiscattering apparatus 2 to perform the deburring work is able to easily handle the workpiece W, thereby enabling to efficiently perform the deburring work.

The dust collecting device 15 sucks and collects the chips received by the chip pan 6, thereby enabling to effectively prevent the scattering of the chips and further efficiently collect the chips.

The work table apparatus 1 includes the lifting mechanism 8 which moves the table 5 upward and downward in the vertical direction, thereby enabling to freely adjust the table 5, that is, the workpiece W, in height inside the chip antiscattering apparatus 2 depending on the height of a worker. Accordingly, the deburring work to the workpiece W is enabled to be performed more efficiently.

The blower device 13 is configured to send air from behind the worker M who enters the inside of the chip antiscattering apparatus 2 to perform the deburring work, toward the workpiece W placed on the work table apparatus 1, thereby enabling to more reliably prevent the scattering of the chips to the outside.

The blower device 13 is configured so that air blows from behind obliquely to the worker M who enters the inside through the worker entrance opening S1 disposed to the chip antiscattering apparatus 2, to perform the deburring work, and further forms the air curtain which obstructs the worker entrance opening S1, thereby enabling to reliably prevent the scattering of the chips to the outside even in the case where the worker entrance opening S1 is disposed.

Figure 1:
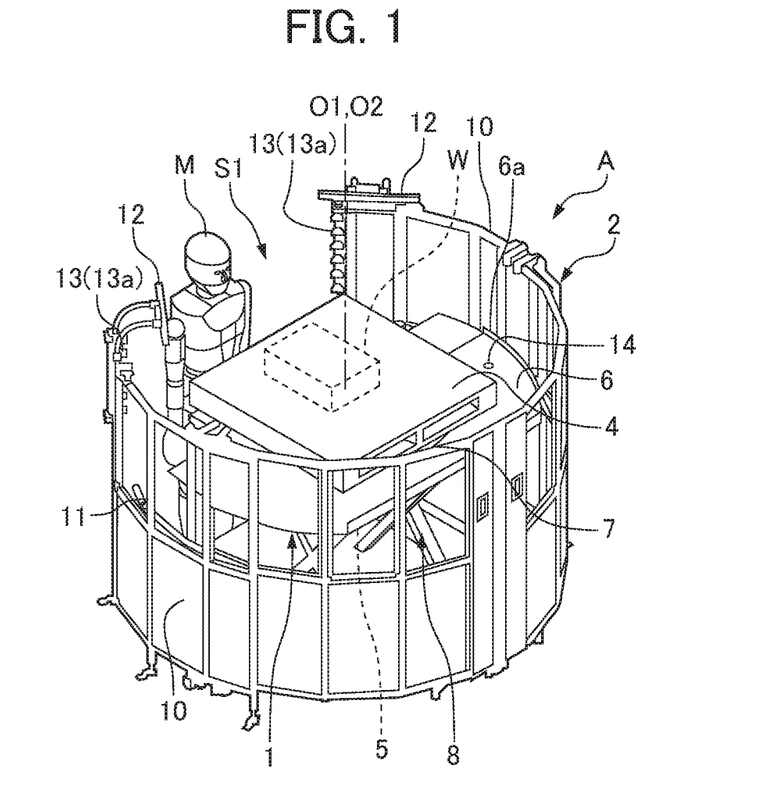
FIG. 1 is an oblique view illustrating a dust collection deburring apparatus according to one embodiment of the present invention, in the state (initial state) where the deburring work is performed with a worker entrance opening opened.
Figure 2:
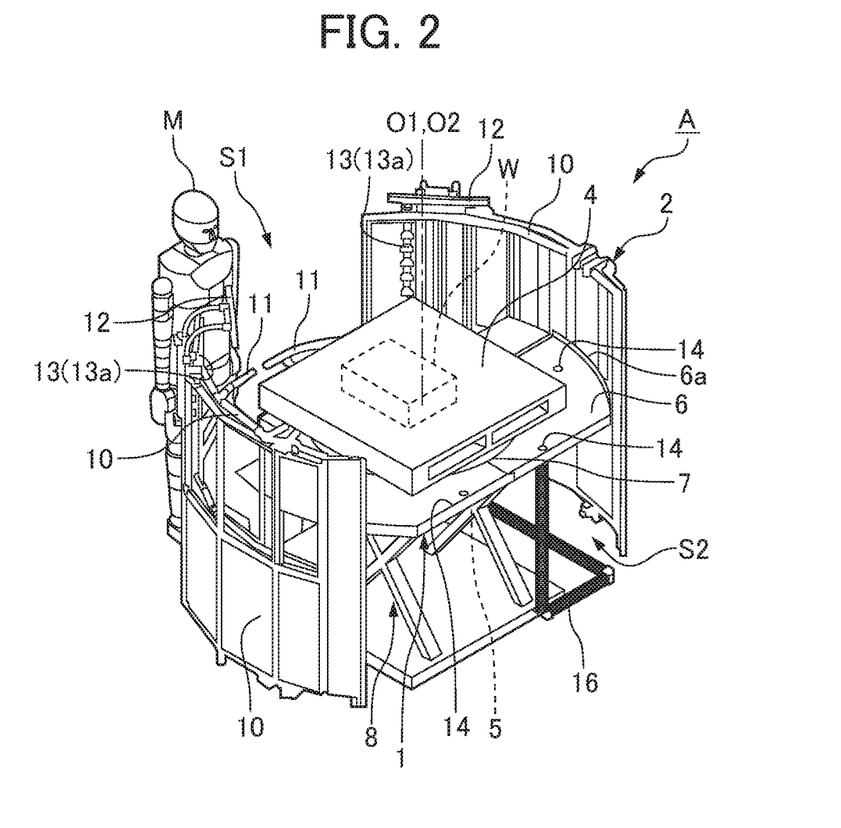
FIG. 2 is an oblique view illustrating the dust collection deburring apparatus according to one embodiment of the present invention, in the state where a product delivery opening is formed.
Figure 3:
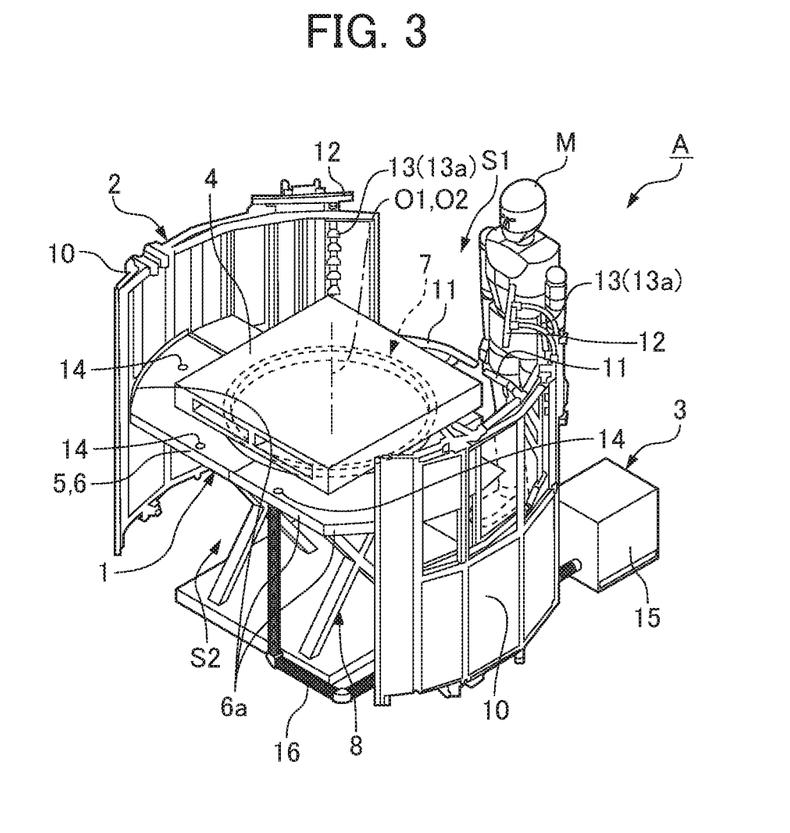
FIG. 3 is another oblique view illustrating the dust collection debarring apparatus according to one embodiment of the present invention, in the state where the product delivery opening is formed.
Figure 4:
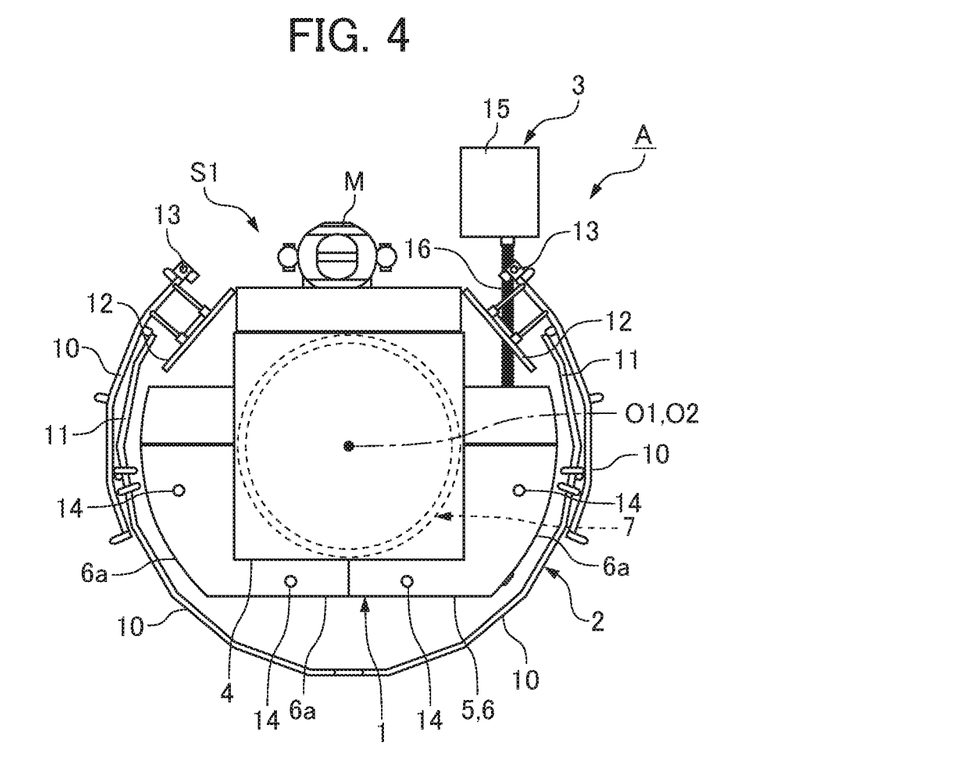
FIG. 4 is a plan view illustrating the dust collection deburring apparatus according to one embodiment of the present invention, in the state (initial state) where the deburring work is performed with the worker entrance opening opened.
Figure 5:
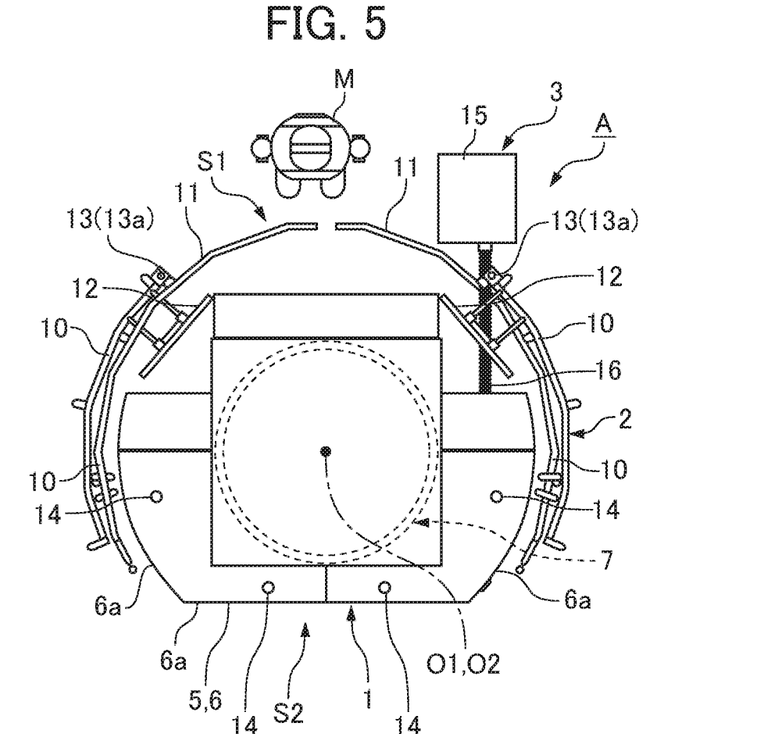
FIG. 5 is a plan view illustrating the dust collection deburring apparatus according to one embodiment of the present invention, in the state where the product delivery opening is formed.
Figure 6:
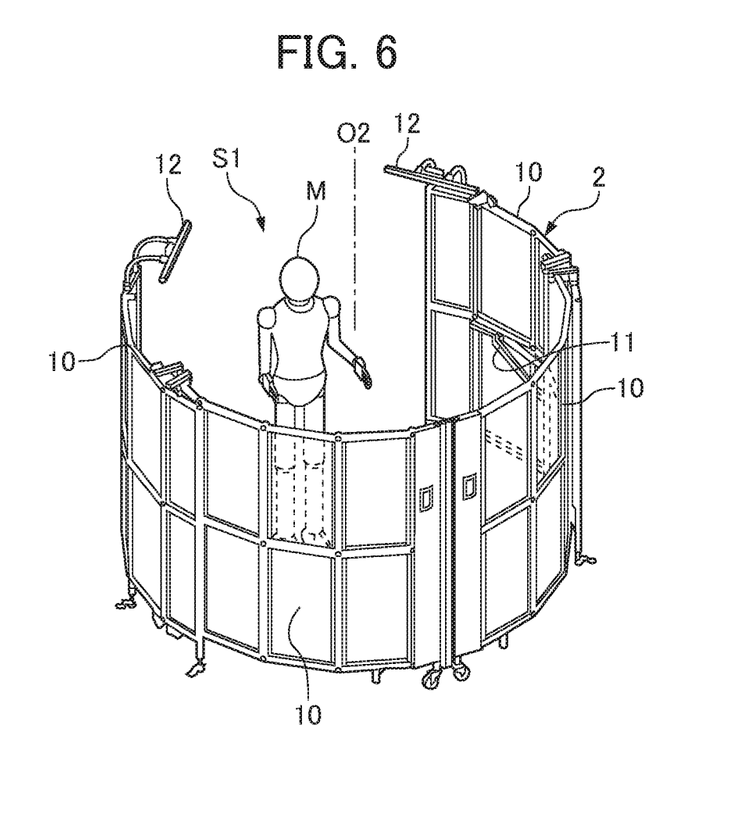
FIG. 6 is an oblique view illustrating a part on wall part of a chip antiscattering apparatus of the dust collection deburring apparatus according to one embodiment of the present invention, in the state (initial state) where the deburring work is performed.
Figure 7:
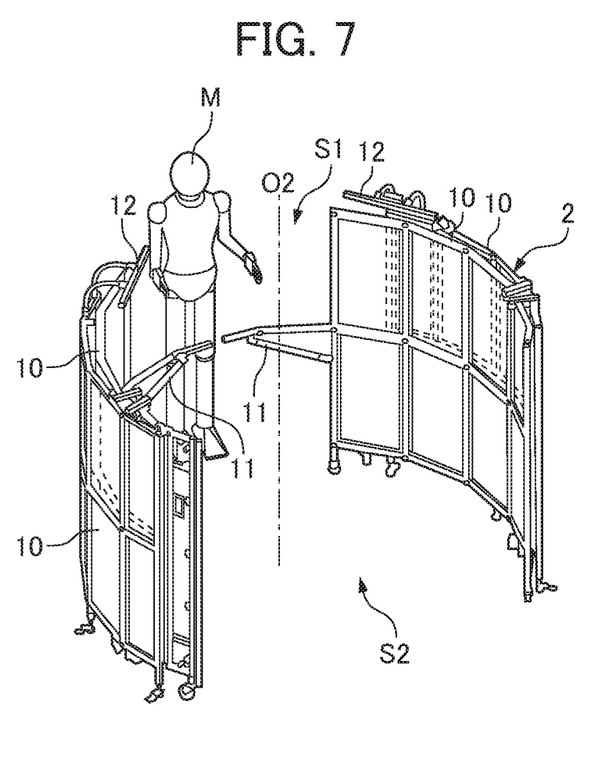
FIG. 7 is an oblique view illustrating the partition wall part of the chip antiscattering apparatus of the dust collection deburring apparatus according to one embodiment of the present invention, in the state where the product delivery opening is formed.
Figure 8:
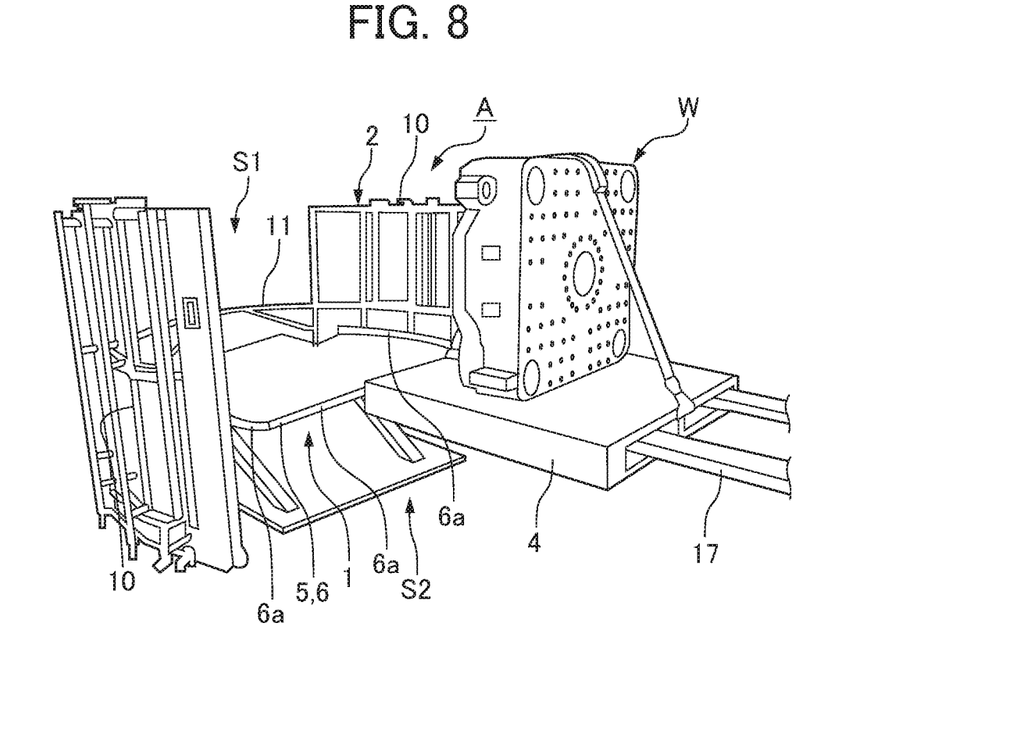
FIG. 8 is an oblique view illustrating the state where a workpiece (product) is delivered to a work table apparatus by use of a forklift.

The chip antiscattering apparatus 2 includes the partition wall part 10 vertically provided so as to surround the work table apparatus 1, and the rotation of the partition wall part 10 forms at least one of the worker entrance opening S1 and the product delivery opening S2, whereby a forklift 17 is allowed to deliver the workpiece W placed on the pallet 4 to and from the work table apparatus 1, as shown in FIG. 8.

In the partition wall part 10 according to the present embodiment, the sliding operation for open of sliding and rotating a part of the partition wall part 10 simply enables to open and close the product delivery opening S2. This allows the workplace W to be easily delivered.

The partition wall part 10 performs the sliding operation for open, and the intrusion prevention member 11 automatically protrudes to the worker entrance opening S1 and the product delivery opening S2 is formed, thereby enabling to automatically prevent the worker M or others from entering the inside of the partition wall part 10 during when the forklift 17 delivers the workpiece W therein and therefrom, resulting in ensuring the safety of the worker M and further improving the work efficiency.

Since the wall part 6a is provided along the peripheral edge of the chap pan 6, the wall part 6a is able to suppress the chips received by the chip pan 6 from falling, and more effectively prevent the scattering of the chips.

Accordingly, the dust collection deburring apparatus A according to the present embodiment is capable of performing more efficient deburring work to the workpiece (product) W, and capable of, even in the case of a large workpiece W, performing preferable deburring work, by placing the workpiece W together with the pallet 4 on the work table by the forklift 17.

One embodiment of the dust collection deburring apparatus according to the present invention has been described so far. The present invention is not limited to the one embodiment described above. Appropriate changes are available without deviating from the gist.

EXPLANATION OF REFERENCE NUMERALS

1 WORK TABLE APPARATUS
2 CHIP ANTISCATTERING APPARATUS
3 CHIP SUCTION COLLECTION APPARATUS
4 PALLET
5 TABLE
6 CHIP PAN
6a WALL PART
7 ROTATING MECHANISM
8 LIFTING MECHANISM
10 PARTITION WALL PART
11 INTRUSION PREVENTION MEMBER
12 LIGHTING DEVICE
13 BLOWER. DEVICE
13a AIR NOZZLE
14 CHIP SUCTION HOLE
15 DUST COLLECTING DEVICE
16 SUCTION PIPE
17 FORKLIFT
A DUST COLLECTION DEBURRING APPARATUS
M WORKER
S1 WORKER ENTRANCE OPENING
S2 PRODUCT DELIVERY OPENING
W WORKPIECE (PRODUCT)

What is claimed is:

1. A dust collection deburring apparatus for deburring work to a product placed on a pallet, the dust collection deburring apparatus comprising:
    a work table apparatus configured to allow the product together with the pallet to be placed on and allow a worker to perform the deburring work;
    a chip antiscattering apparatus arranged so as to surround the work table apparatus and configured to prevent scattering of chips; and
    a chip suction collection apparatus including a dust collecting device configured to suck air from an internal space surrounded by the chip antiscattering apparatus to suck the chips generated in the deburring work; wherein
    the chip antiscattering apparatus includes a partition wall part vertically provided so as to surround the work table apparatus,
    the partition wall part is configured so that at least a part of the partition wall part is rotatable around a central axis extending in a vertical direction, and the rotation selectively forms a worker entrance opening at a first rotation position and a product delivery opening at a second rotation position, the product delivery opening disposed at a location separate from and approximately 180 degrees in a rotation direction from the worker entrance opening, and
    the worker entrance opening is configured to allow a worker to enter an inside of the partition wall part and exit to an outside of the partition wall part, and the product delivery opening is configured to allow the product together with the pallet to be delivered to and from the work table apparatus inside the partition wall part.

2. The dust collection deburring apparatus according to claim 1, the work table apparatus including:
    a table;
    a chip pan supported by the table and placed on the table; and
    a rotating mechanism supported by the table, and configured to support the pallet and the product placed on the chip pan in a rotatable manner around a rotary axis extending in a vertical direction.

3. The dust collection deburring apparatus according to claim 2, wherein
    the chip pan includes a wall part projecting upward and extending along a peripheral edge of the chip pan, and the peripheral edge with at least the wall part is formed so as to be in contact with and along an inner surface of the partition wall part of the chip antiscattering apparatus.

4. The dust collection deburring apparatus according to claim 1, wherein
    the chip suction collection apparatus
    is configured so that the dust collecting device sucks and collects the chips received by a chip pan.

5. The dust collection deburring apparatus according to claim 1, the dust collection deburring apparatus comprising:
    a blower device configured to send air from behind the worker entering an inside of the chip antiscattering apparatus to perform the deburring work, toward the product placed on the work table apparatus.

6. The dust collection deburring apparatus according to claim 5, wherein
    the blower device is configured so that air blows from behind obliquely to the worker entering the inside through a worker entrance opening disposed to the chip antiscattering apparatus to perform the deburring work, and further forms an air curtain configured to obstruct the worker entrance opening.

7. The dust collection deburring apparatus according to claim 1, wherein
    the partition wall part is configured, so that a part of the partition wall part is allowed to perform the rotation to be slid in a direction along a wall surface of the partition wall part and that a sliding operation for open forms the product delivery opening.

8. The dust collection deburring apparatus according to claim 7, wherein
    the chip antiscattering apparatus is configured, so that an intrusion prevention member protrudes to the worker entrance opening when the sliding operation for open of the partition wall part is performed, and prevents the worker from entering the inside through the worker entrance opening.

* * * * *